(12) United States Patent
D'Agostino

(10) Patent No.: US 7,893,958 B1
(45) Date of Patent: Feb. 22, 2011

(54) VEHICLE VIDEO RECORDER

(76) Inventor: Daniel M. D'Agostino, 1803 Bay Hill Dr., Austin, TX (US) 78746

( * ) Notice: Subject to any disclaimer, the term of this patent is extended or adjusted under 35 U.S.C. 154(b) by 1323 days.

(21) Appl. No.: 11/396,934

(22) Filed: Apr. 3, 2006

(51) Int. Cl.
*H04N 7/18* (2006.01)
*H04N 5/225* (2006.01)

(52) U.S. Cl. .................. 348/148; 348/373; 348/374

(58) Field of Classification Search ... 348/14.01–14.16, 348/148, 207.99, 373–376, 117–118
See application file for complete search history.

(56) References Cited

U.S. PATENT DOCUMENTS

| | | | | |
|---|---|---|---|---|
| 3,689,695 A * | 9/1972 | Harry et al. | .................. | 348/148 |
| 4,233,634 A * | 11/1980 | Adams | ........................ | 348/373 |
| 4,946,272 A * | 8/1990 | Brown | ........................ | 352/243 |
| 5,262,813 A | 11/1993 | Scharton | | |
| 5,311,197 A | 5/1994 | Sorden et al. | | |
| 5,412,417 A * | 5/1995 | Tozuka | ..................... | 348/14.01 |
| 5,581,464 A | 12/1996 | Woll et al. | | |
| 5,598,207 A * | 1/1997 | Kormos et al. | .............. | 348/148 |
| 5,729,016 A * | 3/1998 | Klapper et al. | .............. | 250/334 |
| 5,850,254 A * | 12/1998 | Takano et al. | ................ | 348/148 |
| 6,147,701 A * | 11/2000 | Tamura et al. | ................ | 348/36 |
| 6,389,340 B1 | 5/2002 | Rayner | | |
| 6,611,661 B2 * | 8/2003 | Buck | ........................... | 396/19 |
| 6,642,906 B1 * | 11/2003 | Machalek | .................... | 343/872 |
| 6,715,940 B2 * | 4/2004 | Top et al. | ...................... | 396/427 |
| 6,762,790 B1 * | 7/2004 | Matko et al. | ................. | 348/148 |
| 6,793,414 B2 * | 9/2004 | Akada | ......................... | 396/427 |
| 7,061,536 B2 * | 6/2006 | Cha | ............................. | 348/376 |
| 7,286,181 B2 * | 10/2007 | Cha | ............................. | 348/373 |
| 7,446,813 B2 * | 11/2008 | Nakamoto et al. | ........... | 348/374 |
| 7,534,057 B2 * | 5/2009 | Jones et al. | .................. | 396/427 |
| 2002/0044216 A1 * | 4/2002 | Cha | ............................. | 348/376 |
| 2002/0131781 A1 * | 9/2002 | Buck | ........................... | 396/419 |
| 2003/0193612 A1 * | 10/2003 | Oliver | ......................... | 348/374 |
| 2003/0201371 A1 * | 10/2003 | Zadok | ....................... | 248/276.1 |
| 2004/0223062 A1 * | 11/2004 | Pettegrew et al. | ......... | 348/211.4 |
| 2005/0196162 A1 * | 9/2005 | Mootz et al. | ................. | 396/428 |
| 2005/0275725 A1 * | 12/2005 | Olsson et al. | ........... | 348/207.99 |
| 2006/0232670 A1 * | 10/2006 | Chu | ............................ | 348/118 |
| 2008/0165250 A1 * | 7/2008 | Ekdahl et al. | ............... | 348/148 |
| 2010/0110192 A1 * | 5/2010 | Johnston et al. | ............. | 348/148 |

* cited by examiner

*Primary Examiner*—David L Ometz
*Assistant Examiner*—Richard Bemben

(57) ABSTRACT

A video recorder which can be mounted on a surface, such as a windshield, on a vehicle, such as an automobile, for creating and recording images in response to a triggering event, such as a sudden deceleration, includes a housing which can be fixedly mounted onto the surface of the vehicle and a printed circuit board mounted inside the housing for rotational movement freely about its longitudinal axis. A camera is fixedly mounted onto the printed circuit board at right angles thereto. An inertia switch also mounted on the printed circuit board activates the camera for a predetermined time period when deceleration of a predetermined value is sensed. A pair of batteries, one on each side of the printed circuit board serve as counter weights to maintain the printed circuit board approximately vertical and the camera horizontal when the vehicle is on a horizontal surface and printed circuit board is in its "at rest" position regardless of the angular orientation of the surface of the vehicle on which the video recorder is mounted. A clutch couples a disk fixedly mounted on one end of the printed circuit board to the housing to lock the printed circuit board at its "at rest" portion. The pair of batteries on the printed circuit board also provide electrical power to the video recorder.

9 Claims, 17 Drawing Sheets

VEHICLE VIDEO RECORDER

BACKGROUND OF THE INVENTION

The present invention relates generally to video recorders and more particularly to a video recorder which can be mounted on a vehicle for creating and recording images in response to a triggering event.

Video recorders which can be mounted on a surface of a vehicle for creating and recording images in response to a triggering event such as a sudden deceleration are well known and may be found in various types of vehicles such as automobiles, trucks and minivans. These devices are often mounted on a surface of the vehicle such as the windshield or the rear window or the rear view mirror or are constructed so as to be a part of the rear view mirror. These devices usually include a camera mounted inside a housing which either is fixedly or adjustably secured to the vehicle.

As can be appreciated, the camera in the video recorder should, ideally, be oriented horizontal relative to the vehicle, i.e. with the optical axis of the camera aligned with the direction of travel of the vehicle, regardless of the angle of the surface of the vehicle on which the video recorder is mounted. Windshields are generally at some acute angle which can vary by several degrees while other surfaces on the vehicle can either be vertical, horizontal or any angle between vertical and horizontal depending on the particular surface.

Some vehicle video recorders do not have any arrangement for varying the camera angle so that it will be horizontal relative to the vehicle while other vehicle video recorders provide some simple way for manually adjusting the camera angle.

In U.S. Pat. No. 6,389,340 to G. A. Rayner there is disclosed a self-contained device for capturing video imagery in response to a triggering event which may include a mirror and be mounted to a vehicle windshield in place of a convention rear-view mirror. The device includes a housing in which the electronics and related elements of the invention are contained. These elements include one or more data sensors, at least one of which is an image sensor. Also included are a data sensor circuit and a capture circuit. The data sensor circuit responds to the triggering event, and may include data sensors coupled to vehicle systems such as a speedometer, tachometer, brake, turn signals or the like, or other data sensors such as an accelerometer or a vehicle position sensor. The triggering event may be, for example, a sudden change in acceleration indicative of an impending collision, or it may be a change in the signal provided by any such data sensor, including the image sensor. The capture circuit is coupled to the image sensor and captures a signal representing the video imagery by recording it in a digital memory, by transmitting it to a remote location, or by other suitable means. The capture circuit terminates capture of the signal in response to the data sensor circuit sensing a triggering event. The captured data thus describe circumstances leading up to the time of the triggering event. The data can be analyzed to help police, insurance or other investigative personnel understand those circumstances.

In U.S. Pat. No. 5,262,813 to T. D. Scharton there is disclosed an impact triggering mechanism for a camera mounted on a rear-view mirror of a vehicle. The impact triggering mechanism provides a unidirectional mechanical output in response to inertial forces from any horizontal direction. Upon sudden impact or deceleration an inertia member connected to the camera depresses the shutter release button on the camera, which the button actuates the shutter in the camera and takes a photographic picture.

Other patents of interest are U.S. Pat. No. 5,581,464 to J. D. Woll etc. and U.S. Pat. No. 5,311,197 to J. L. Sordon, et al. It is an object of this invention to provide a new and improved vehicle video recorder.

It is another object of this invention to provide a video recorder which can be mounted on a vehicle and which includes a camera which is self leveling so that its optical axis can be made horizontal regardless of the angle of the surface of the vehicle on which the video recorder is mounted.

It is still another object of this invention to provide a video recorder as described above in which the camera can be locked in place within the recorder once the camera has been leveled with its optical axis horizontal.

SUMMARY OF THE INVENTION

A video recorder which can be mounted on a vehicle for creating and recording images in response to a triggering event such as a sudden deceleration includes a housing, means for fixedly mounting said housing onto a surface of said vehicle, a printed circuit board having a longitudinal axis, means for mounting said printed circuit board inside said housing for rotational movement freely about its longitudinal axis, said longitudinal axis lying in a horizontal plane, a camera fixedly mounted on said printed circuit board at right angles thereto for creating images when activated and storing said images, an acceleration switch for activating said camera for a predetermined time period only when acceleration of a predetermined value is sensed, acceleration of a predetermined value constituting said triggering event, means on the printed circuit board for causing the optical axis of the camera to be oriented approximately horizontal when said housing is fixedly mounted on the vehicle, the vehicle is on a horizontal surface and the printed circuit board is in its "at rest" position, means for locking said printed circuit board in its "at rest" position for rotational movement relative to said housing and electronics coupled to said camera for operating said video recorder.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like references numerals represent like parts:

FIG. 1A is a section view of the foam adhesive shown in FIG. 1;

DETAILED DESCRIPTION OF THE PREFERRED EMBODIMENT

The present invention is directed to a video recorder which can be affixed to the front or rear window or other surface of an automobile or other vehicle. The video recorder senses acceleration during an event such as an accident and using a video camera records the incident within ¹/₁₀ th of a second and continues for 30 seconds. The video recorded is stored on an internal non-volatile memory device. The memory device stores up to 3 videos. Subsequent videos are recorded, overwriting the oldest video. The information from the video recorder can be copies to a personal computer via a mini USB port. The recorder includes a self leveling device and a locking mechanism to allow it to be affixed to a window or other surface on the vehicle so that the optical axis of the video camera will be aligned with the direction of travel of the vehicle regardless of the angle of the window or other surface on the vehicle on which the video recorder is mounted.

Although specific embodiments of the present invention will now be described with reference to the drawings, it should be understood that such embodiments are by way of example only and merely illustrative of but a small number of the many possible specific embodiments which can represent applications of the principles for the present invention. Various changes and modifications obvious to one skilled in the art to which the present invention pertains are deemed to be within the spirit, scope and contemplation of the present invention as further defined in the appended claims.

Figure 1:
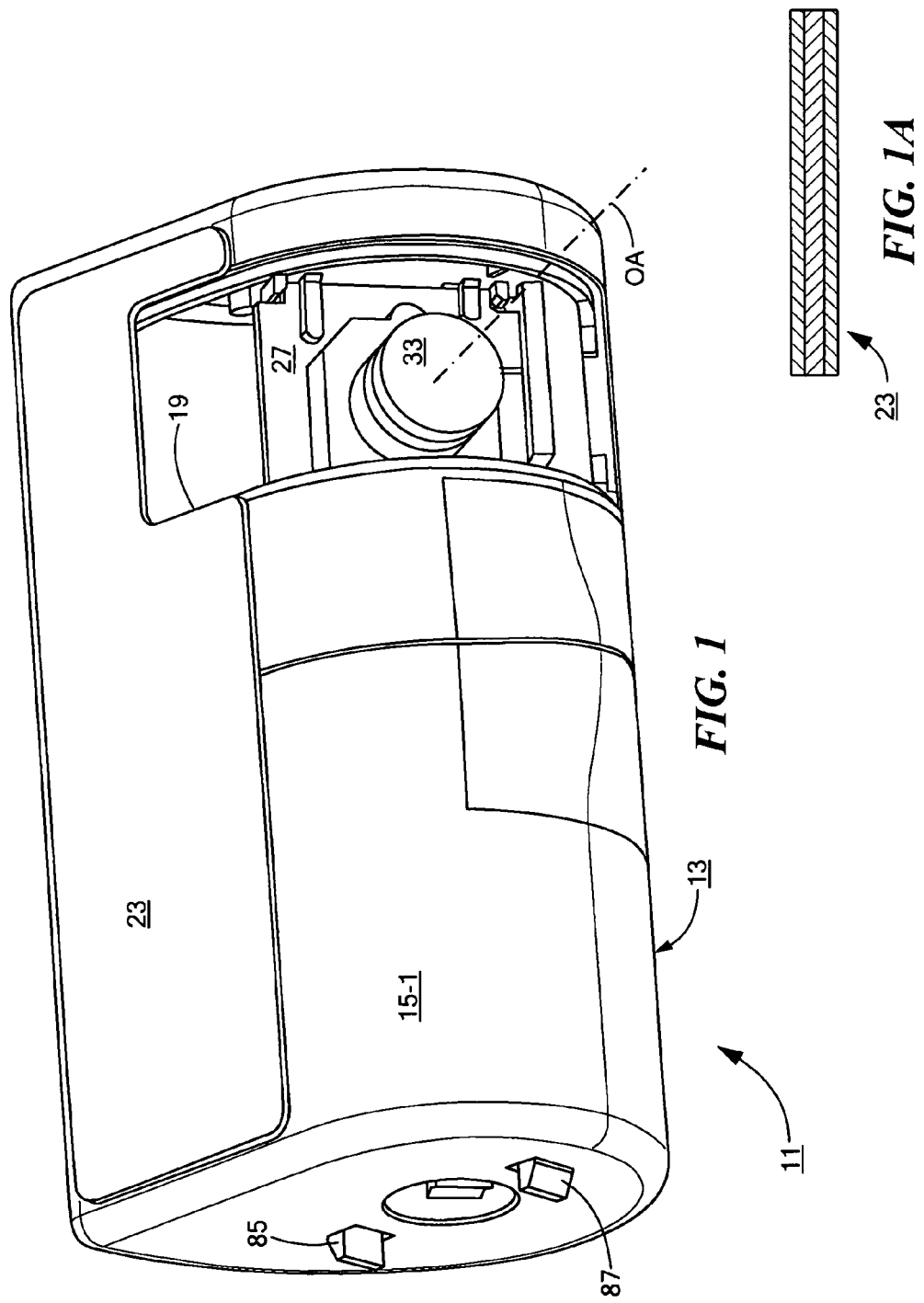
FIG. 1 is a perspective view taken from the front of a vehicle video recorder of the present invention before the camera has been angularly locked in place relative to the housing of the video recorder.
Figure 2:
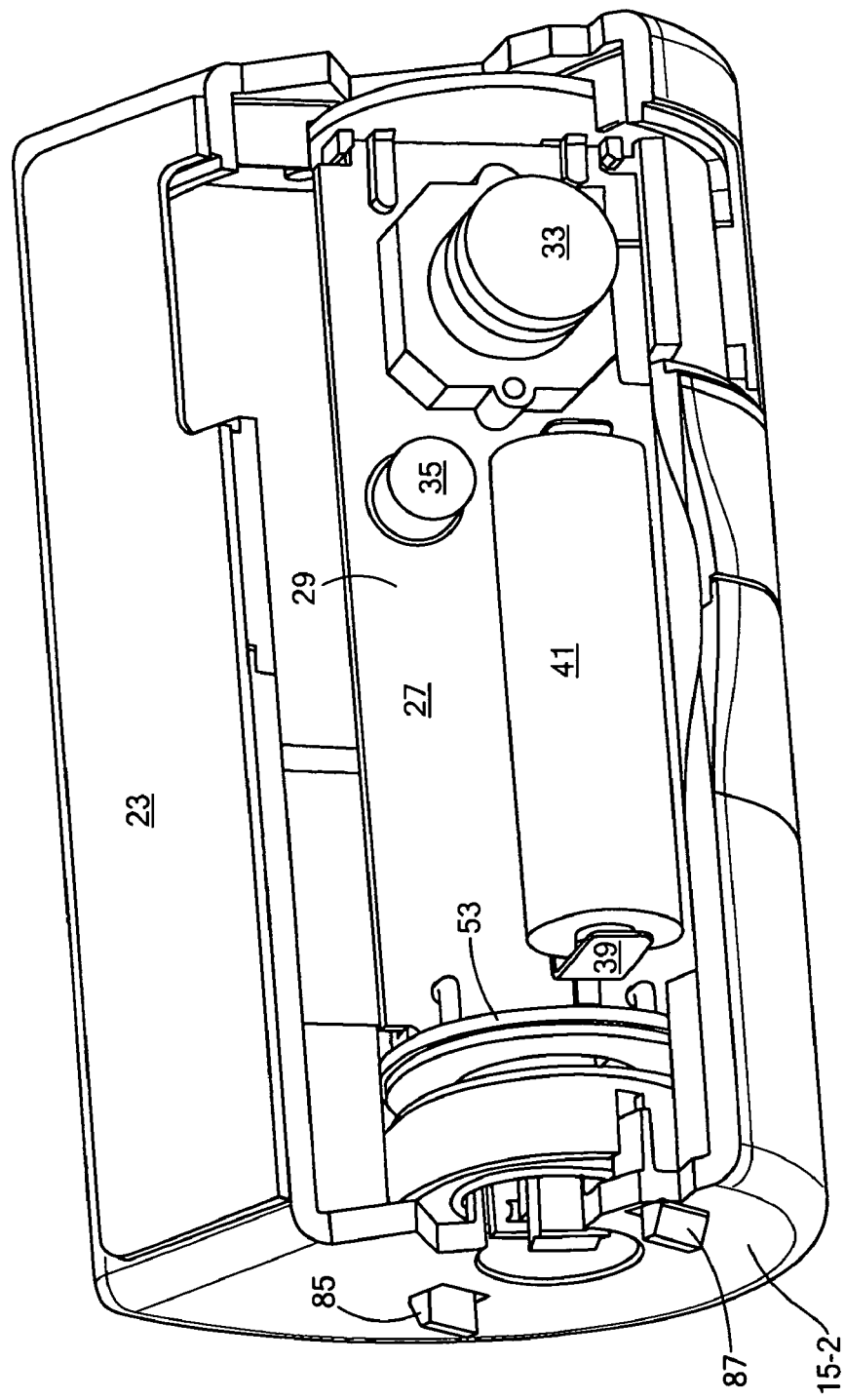
FIG. 2 is a perspective view from the front broken away of the vehicle video recorder shown in FIG. 1.
Figure 3:
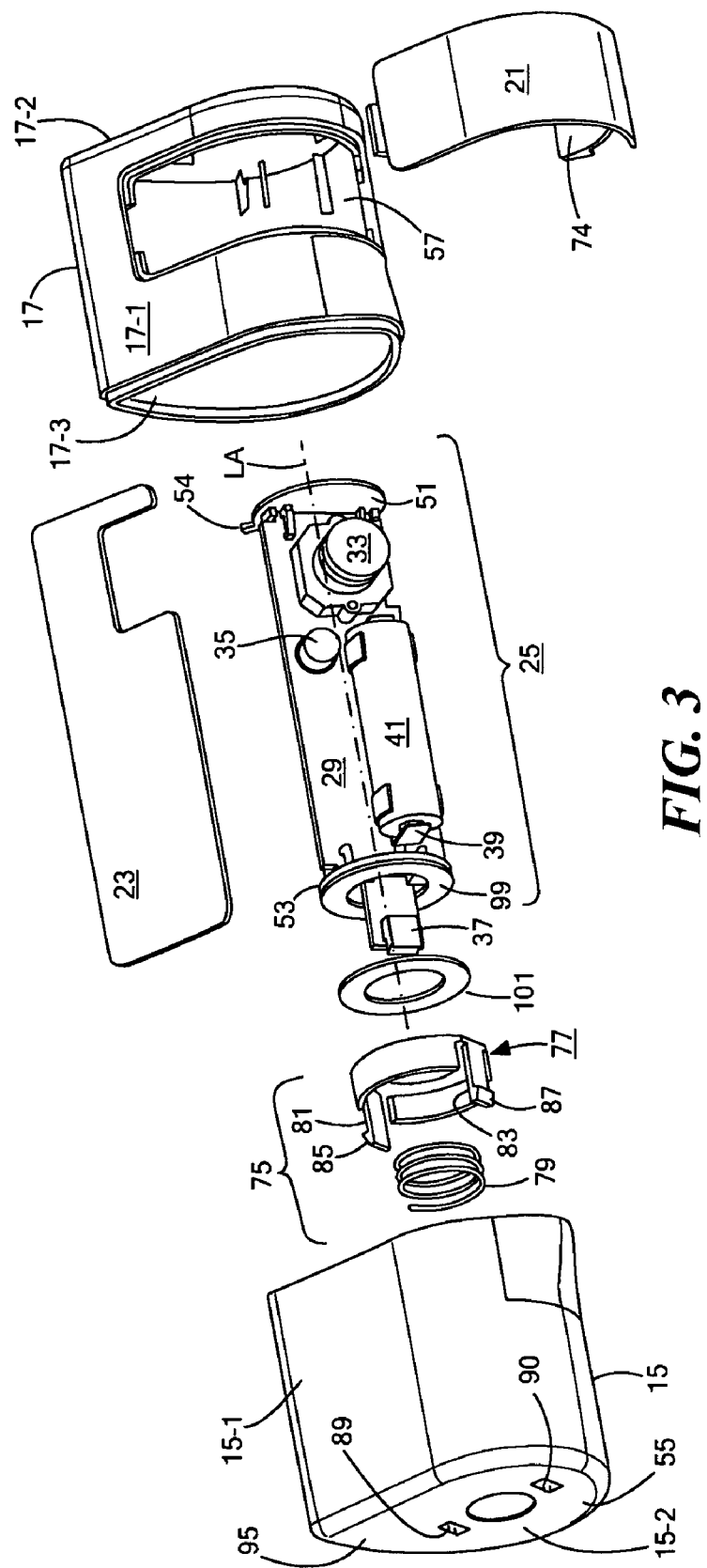
FIG. 3 is an exploded perspective view taken from the front of the vehicle video recorder shown in FIG. 1.

Referring now to the drawings, there is shown in FIG. 1 a video recorder constructed according to this invention and identified by reference numeral 11.

Video recorder 11 includes a housing 13 made of plastic or other suitable rigid material. Housing 13 is made up of a left section 15 and a right section 17, the two sections being ultrasonically welded together. Left section includes a sidewall 15-1, an end wall 15-2 and is open at the right end 15-3. Right section 17 includes a side wall 17-1, an end wall 17-2 and is open at the left end 17-3. A window 21 of optically clear plastic or glass is snap fit onto opening 19 in section 17. A pressure sensitive foam adhesive 23 is fixedly attached to housing 13 for use in fixedly mounting video recorder 11 to a surface of a vehicle. Foam sensitive adhesive 23, as shown in FIG. 1A comprises a bottom layer 23-1 of a pressure sensitive adhesive, a substrate 23-2 of foam, and a top layer 23-3 of a pressure sensitive adhesive. Adhesive 23 may also include a removable release liner (not shown).

A printed circuit board assembly (PCBA) 25 is disposed inside housing 13.

PCBA 25 includes a printed circuit board (PCB) 27 having a front side 29 and a rear side 31. A digital camera 33, an acceleration switch 35, a MINI USB port 37 and a battery holder 39 having a battery 41 are mounted on front side 29 of PCB 27. Acceleration switch 35 may be a switch marketed by Select Controls. Digital camera 33 is fixedly mounted on PCB 27 with its optical axis OA at right angles to the plane of PCB 27. A flash memory 43, an image processor 45 and a battery holder 47 having a battery 49 are mounted on rear side 31 of PCB 27. Battery holders 39 and 47 are located below the longitudinal axis LA of PCB 27.

For simplicity, other components on PCB 27 are not shown.

A pair of disks 51 and 53 are fixedly mounted on the left end 55 and right end 57 respectively of PCB 27 by brackets 59 and 61 integrally formed on disks 51 and 53, respectively. Disks 51 and 53 are suspended on end walls 15-2 and 17-2, respectively inside housing 13 by three ribs 63, 65 and 67 and 70, 71 and 73, respectively, which are integrally formed on end walls 15-2 and 17-2 respectively.

As so mounted, disks 51 and 53 are free to rotate about their center axes. A tab 54 on disc 53 cooperates with ribs on end 71 to limit rotational movement of disc 53 clockwise and counterclockwise. Also, a tab 74 fixed to window 21 prevents PCB 27 from moving to the right toward right end 17-2 of right section 17.

Figure 4:
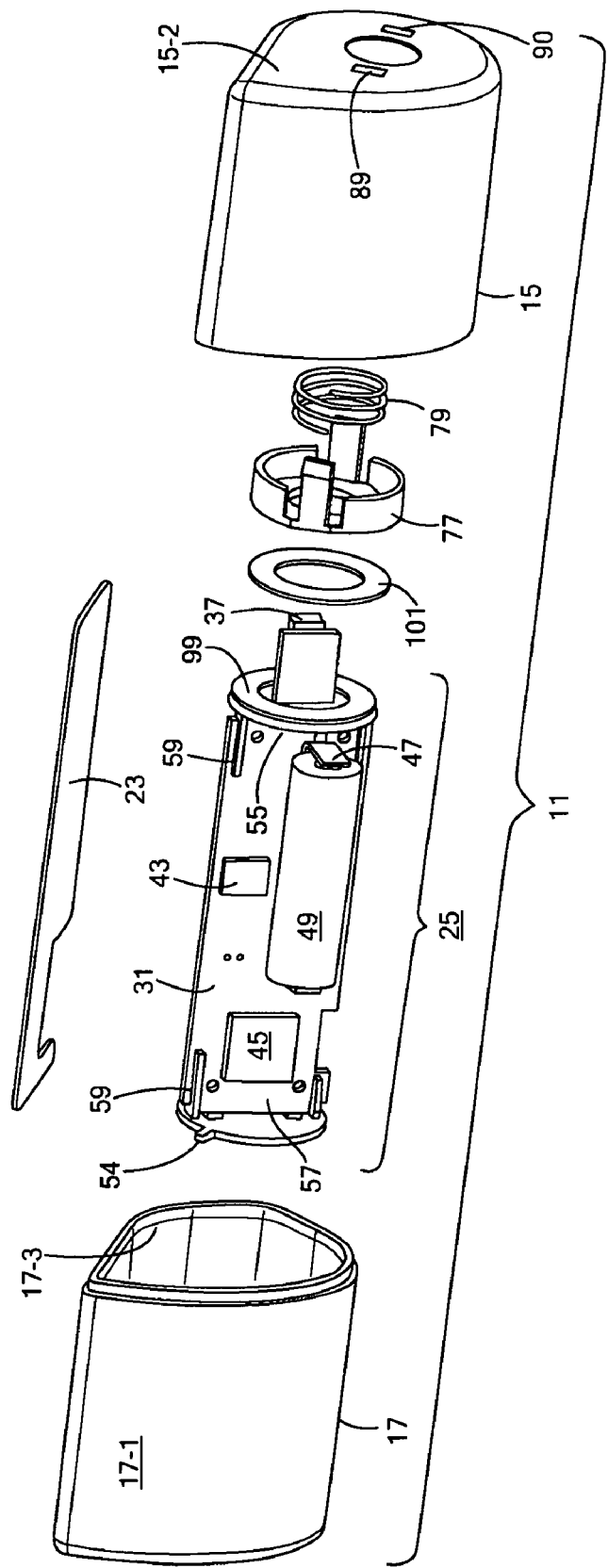
FIG. 4 is an exploded perspective view taken from the rear of the vehicle video recorder shown in FIG. 1.
Figure 4A:
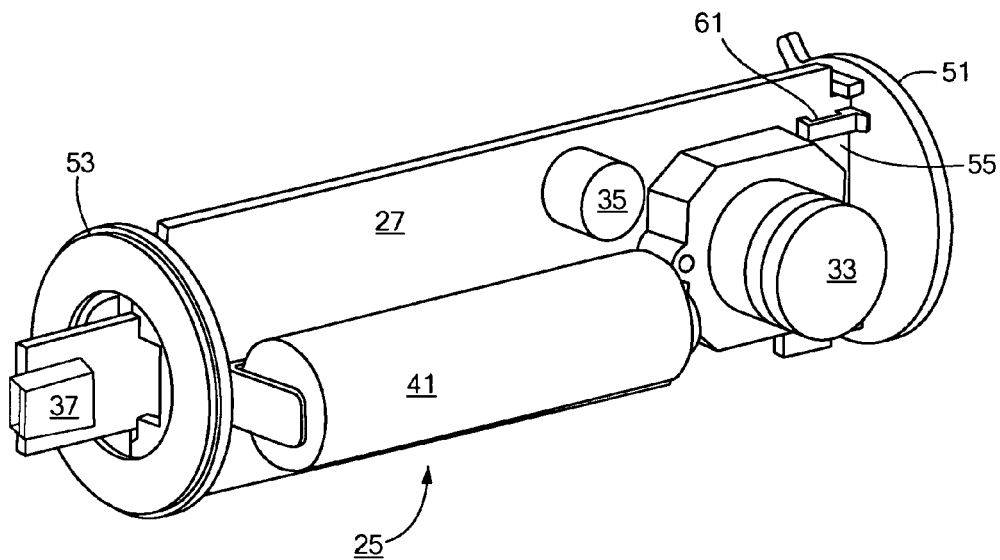
FIGS. 4A and 4B are front and rear views, respectively of the PCBA in FIG. 4.
Figure 4B:
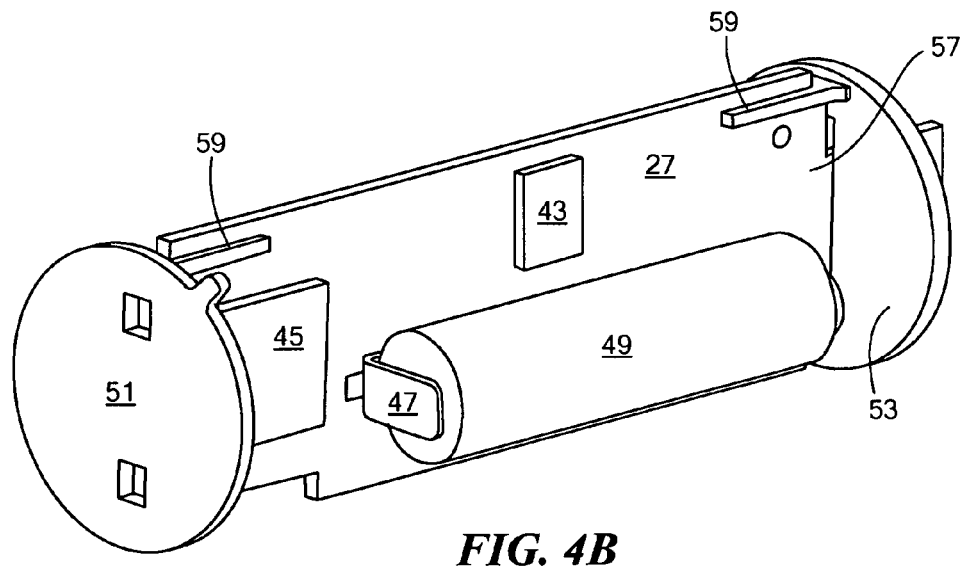
Figure 4C:
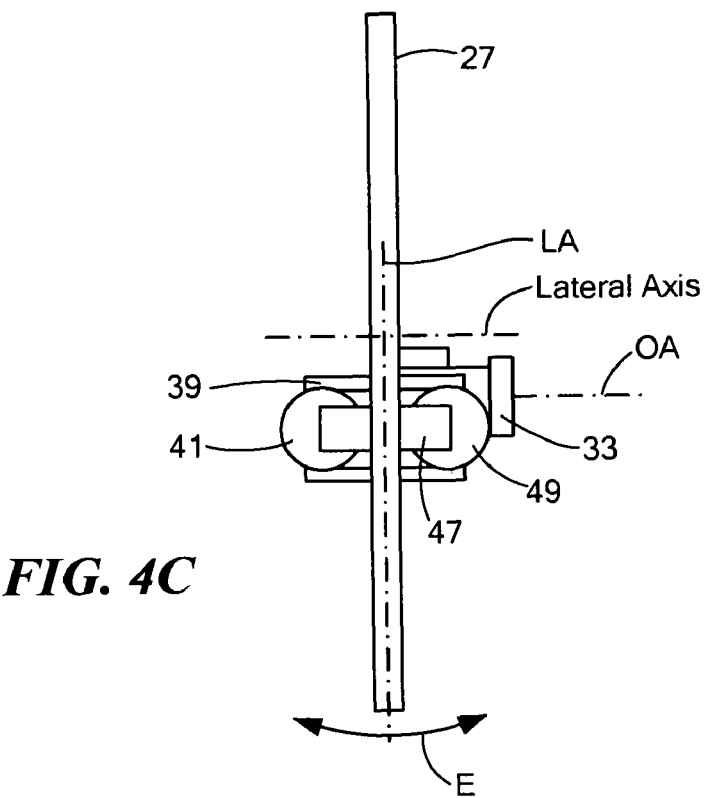
FIG. 4C is a simplified pictorial end view of the PCBA in FIG. 4 showing how the PCB rotates about its longitudinal axis.
Figure 4D:
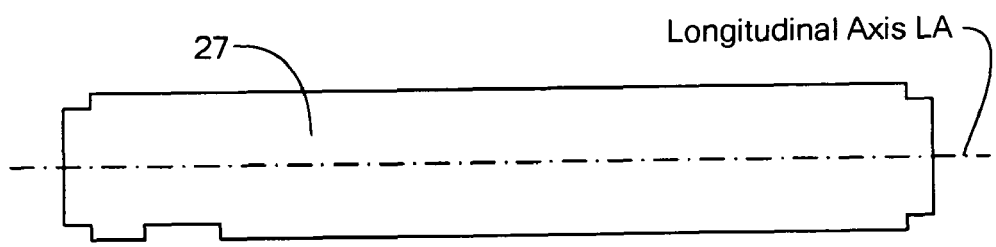
FIG. 4D is a simplified pictorial front view of the PCB in FIG. 4.
Figure 5:
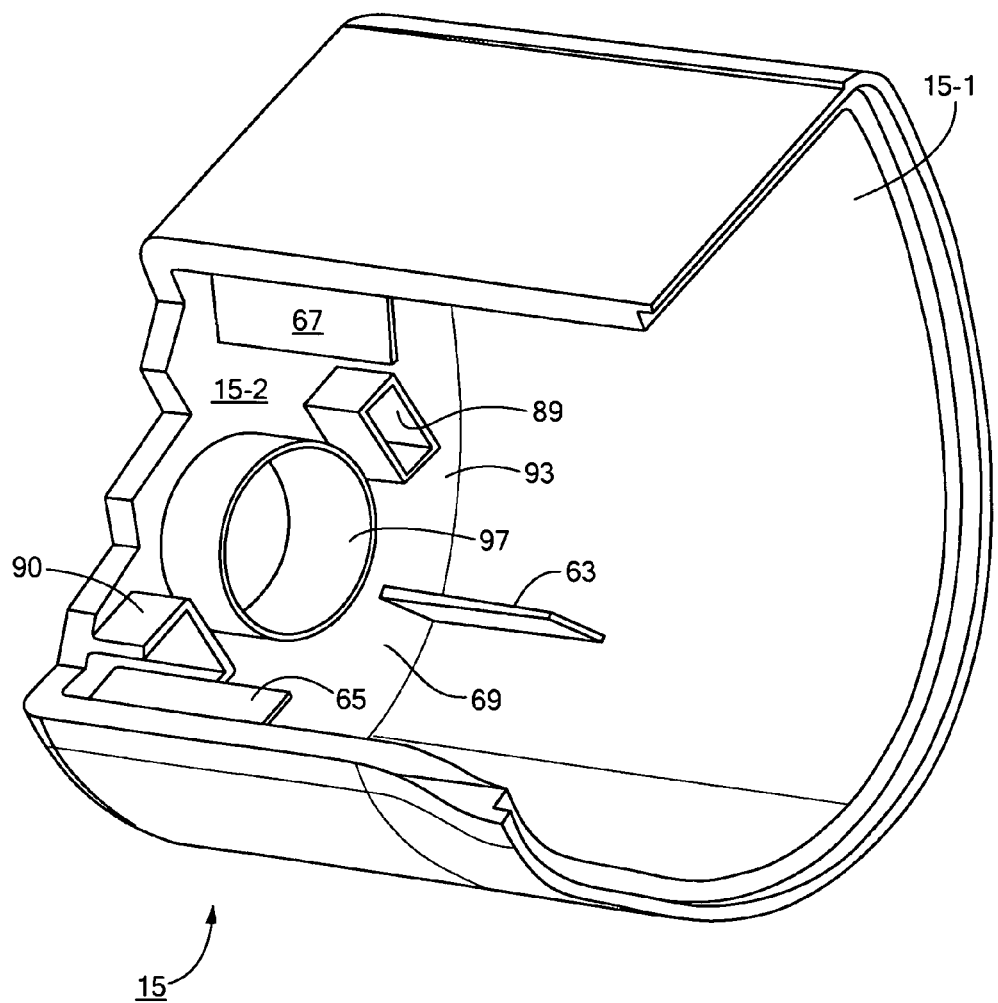
FIG. 5 is a perspective vie broken away of the left housing section of the vehicle video recorder shown in FIG. 1.
Figure 6:
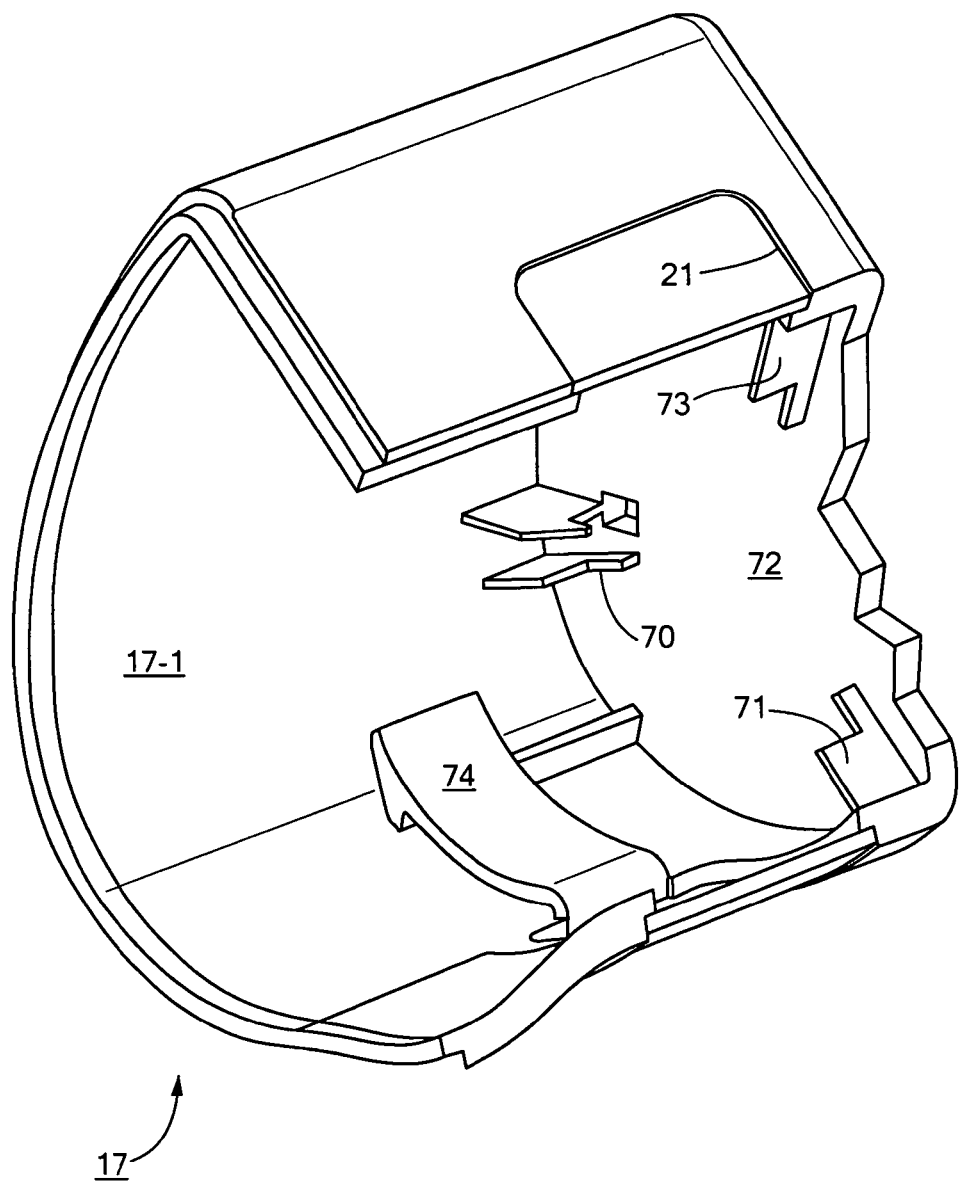
FIG. 6 is a perspective view broken away of the right housing section of the vehicle video recorder shown in FIG. 1.
Figure 7:
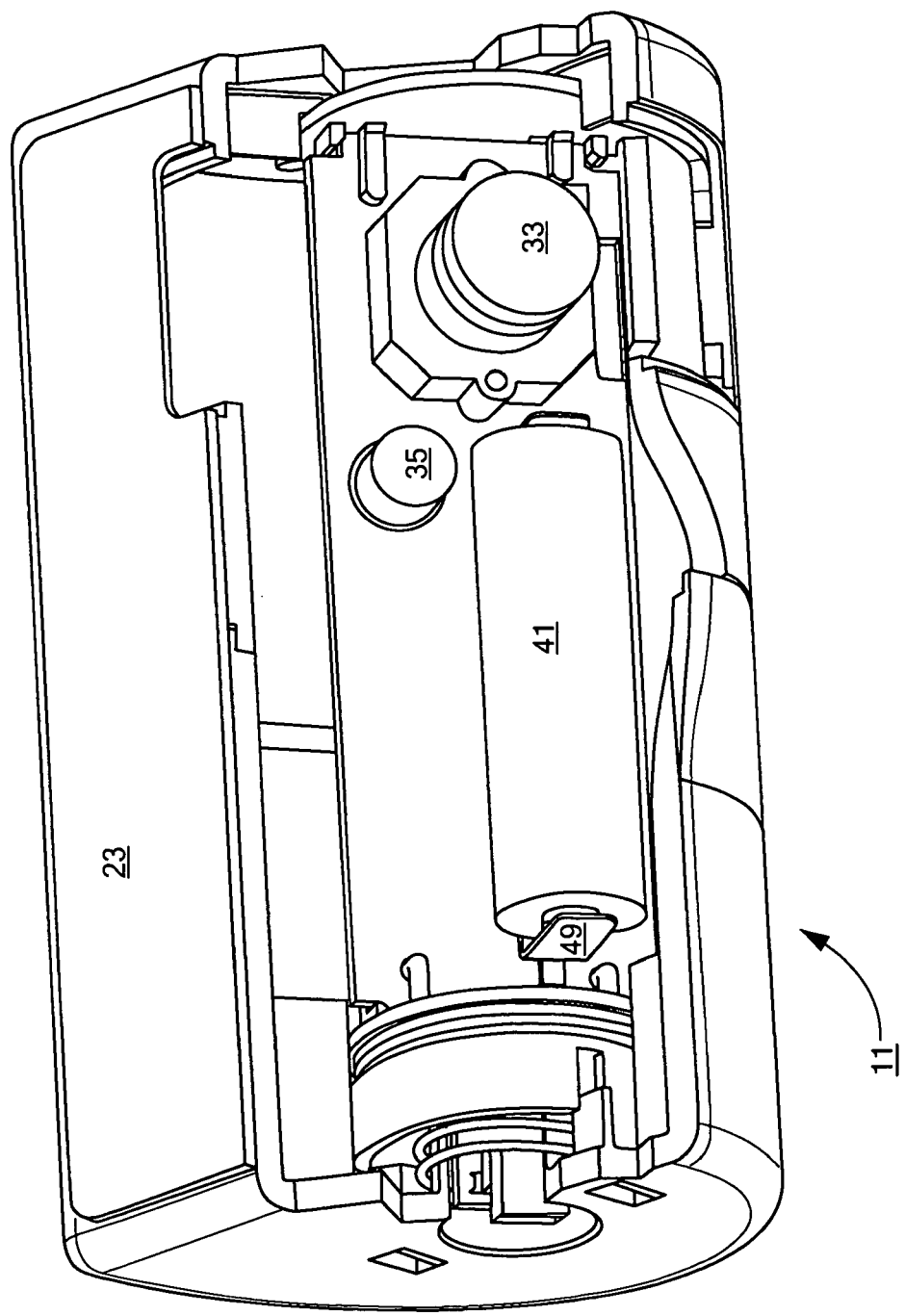
FIG. 7 is a perspective view from the front of the vehicle video recorder after the PCB has been angularly locked in place.

Batteries 41 and 49 are the same size and weight and are located at about the same position on their respective sides of PCB 27. The mounting arrangement of disks 51 and 53 on left section 15 and right section 17 of housing 13 allows PCB 27 to rotate freely about its longitudinal axis LA (see FIGS. 4C and 4D, as shown by arrows E). At the same time, the two batteries 41 and 47 serve as weights which together maintain PCB 27 vertical when PCB 27 is "at rest" on a horizontal surface i.e. not rotating (disregarding the weight of the other components on PCB 27 which can be considered negligible). In addition, batteries 41 and 47 serve as the source of power for video recorder 11.

As a result, PCB 27 will be oriented vertically when the vehicle is on a level surface and is "at rest" and optical axis OA of digital camera 33 will be oriented horizontally when the vehicle is at rest, since digital camera 33 is mounted on PCB 27 at right angles thereto.

Also disposed within housing 13 is a locking mechanism 75 for preventing rotation of PCB 27 within housing 13. Locking mechanism 75 includes a clutch 77 and a compression spring 79. Clutch 77 includes a pair of legs 81 and 83. A pawl 85 is at the end of leg 81 and a pawl 87 is at the end of leg 83.

Legs 81 and 83 are disposed in slots 89 and 91 of end plate 93 of left housing section 15.

Figure 8:
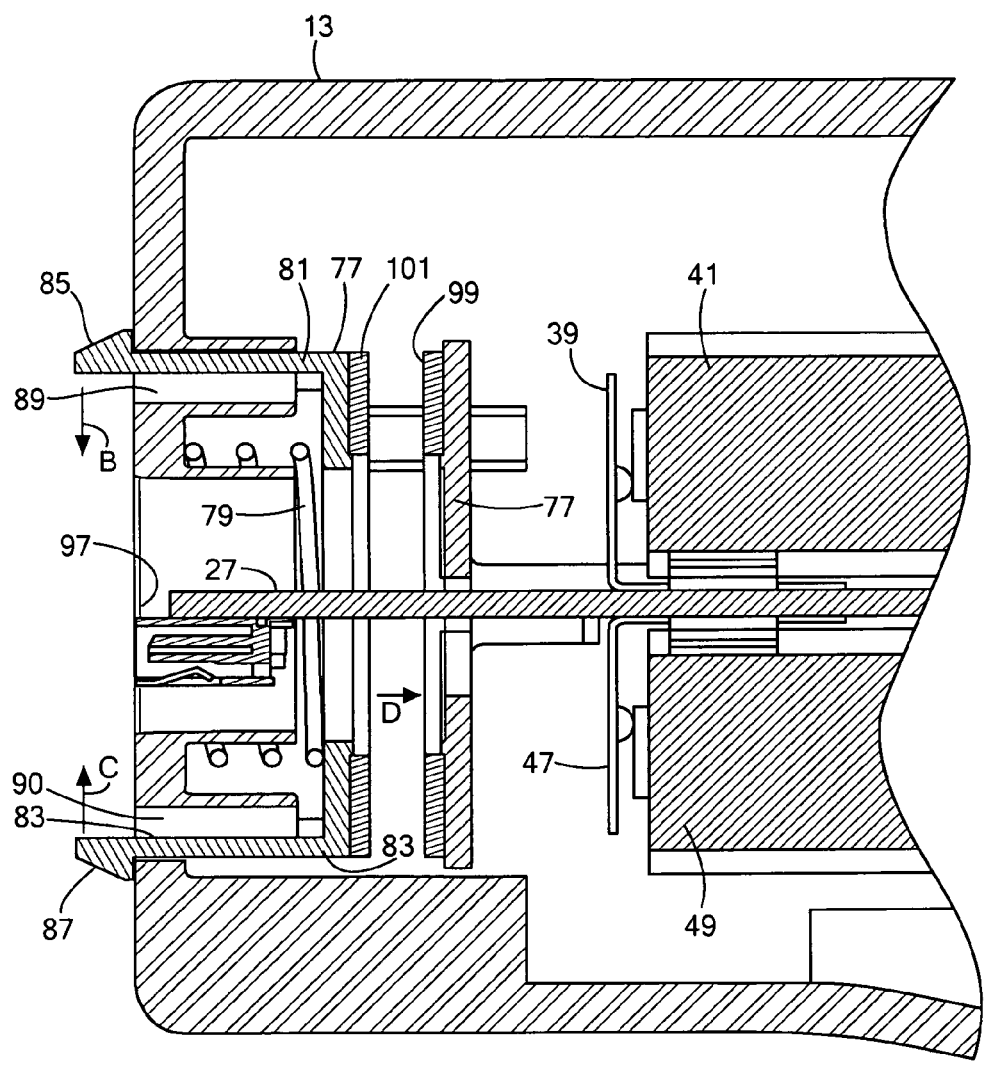
FIG. 8 is a fragmentary view showing the legs of the clutch in the slots of the housing before leveling.
Figure 9:
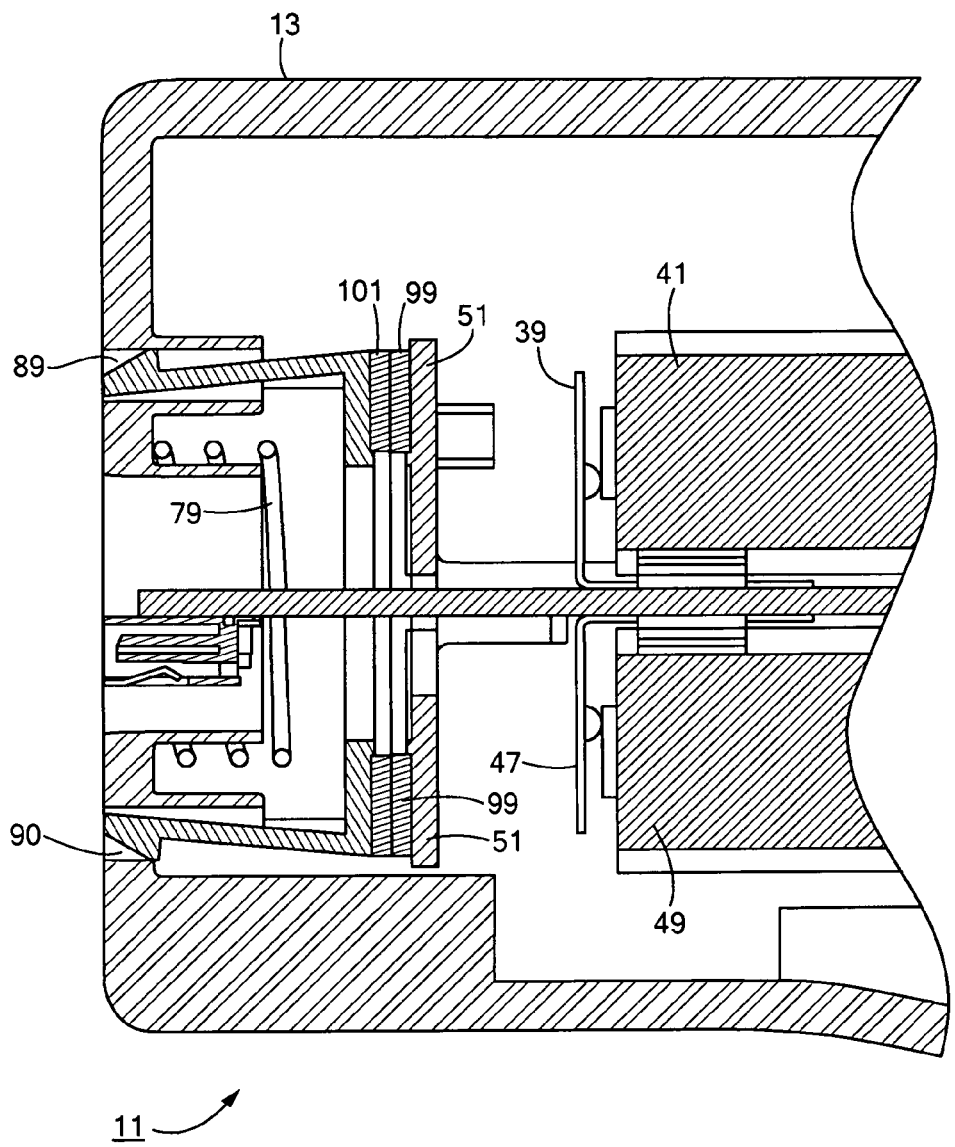
FIG. 9 is a fragmentary view showing the legs of the clutch in the slots of the housing after leveling.
Figure 10:
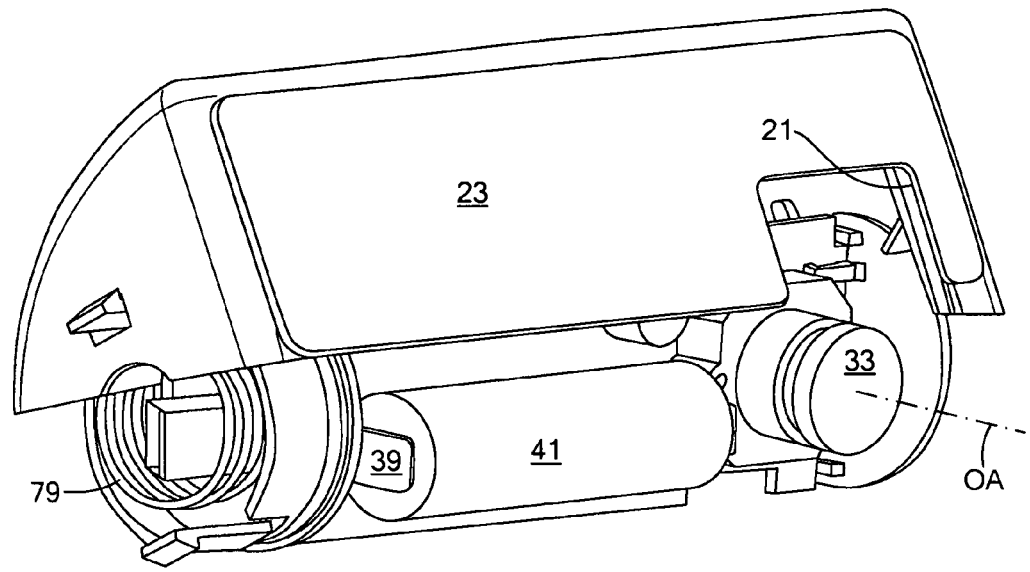
FIG. 10 is a perspective view broken away showing the PCB angularly locked in at one angle relative to the housing.
Figure 11:
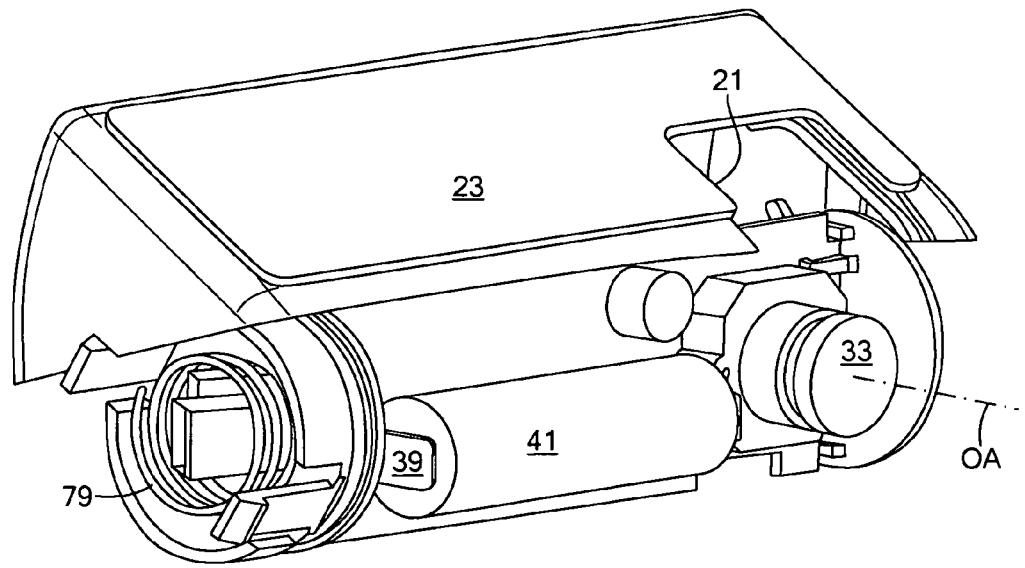
FIG. 11 is a perspective view broken away showing the PCB angularly locket at another angle.

Prior to locking PCB 27 so that it cannot rotate within housing 13, clutch 77 and spring 79 are positioned as shown in FIG. 8, with legs 81 and 83 disposed in slots 89 and 90; pawls 85 and 87 at the ends of legs 81 and 83 extending out and gripping onto the outside surface 95 of end plate 15-2 of left housing section 15 and disk 53 spaced from clutch 77.

After video recorder 11 is fixedly mounted onto a vehicle, camera 33 is made level and then locked in place against rotation in the following manner.

First, vehicle is placed on a surface (such as a road) which is horizontal, i.e. not angled upward or downward. Then, after PCB is made level (allowed to come to rest disposed vertically) pawls 85 and 87 are squeezed towards each other as shown by arrows B, C until they are released from pressing against outside surface 95 of end wall 15-2. At the same time, compression spring 79 which is seated in cylindrical projection 97 expands, pushing clutch 77 to the right in the direction of arrow D until it hits up against disk 53. Adhesive tape 99 on the left side of disk 53 engages adhesive tape 101 on the right side of clutch 77 to fixedly secure disk 53 to clutch 77. Although pawls 85 and 87 have retracted, they are still within slots 89 and 90. Consequently, clutch 77 cannot rotate relative to housing 13 and since clutch 77 is fixedly secured to disk 51, housing 13 cannot rotate relative to disk 51. Since disk 51 is fixed relative to PCB 27 and camera 27 is fixed relative to PCB 27, camera 33 cannot rotate relative to housing 13.

Figure 12:
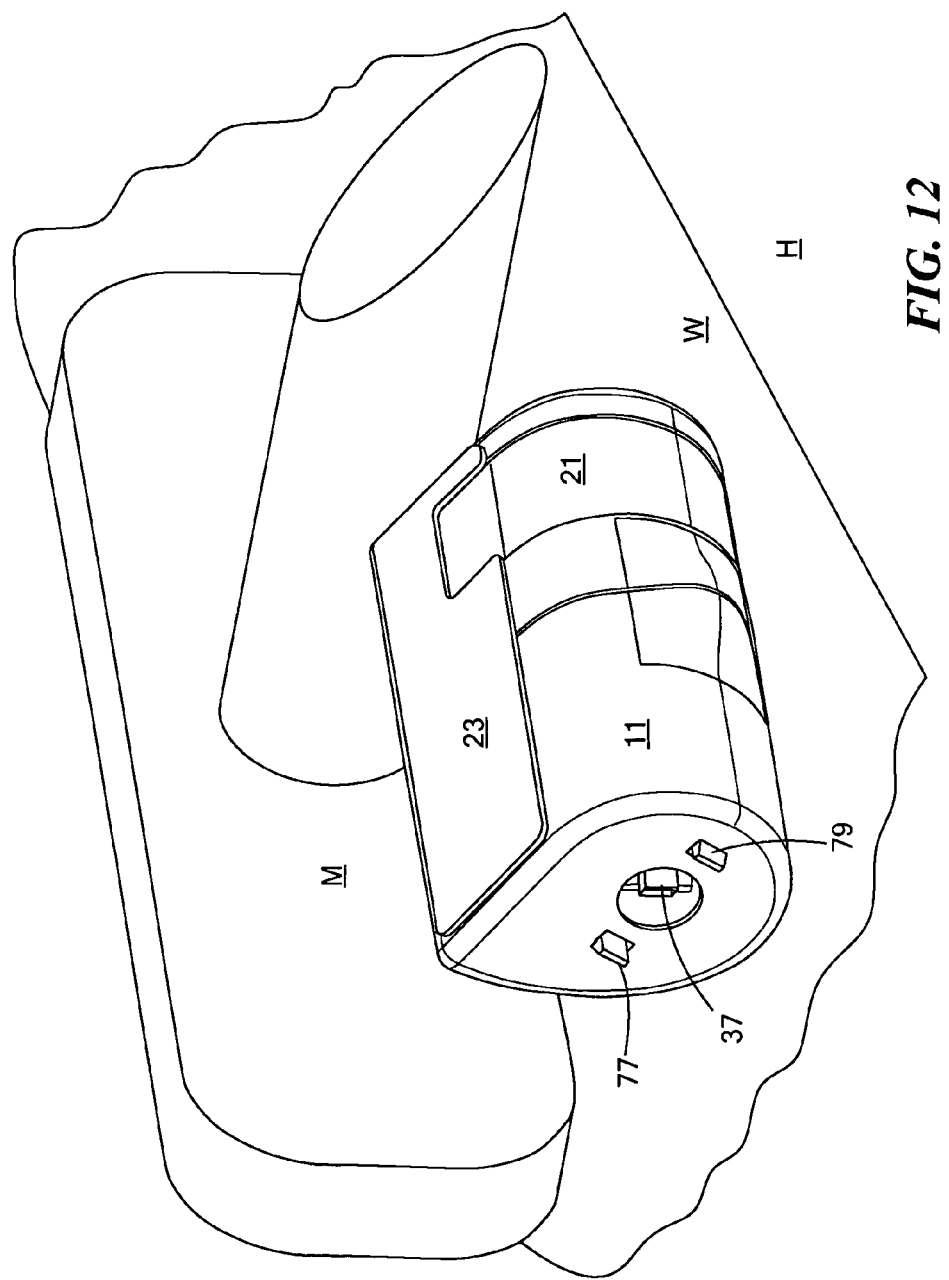
FIG. 12 is a perspective view showing the vehicle video recorder of claim 1 mounted on a windshield next to a rear view mirror prior to leveling and locking.
Figure 13:
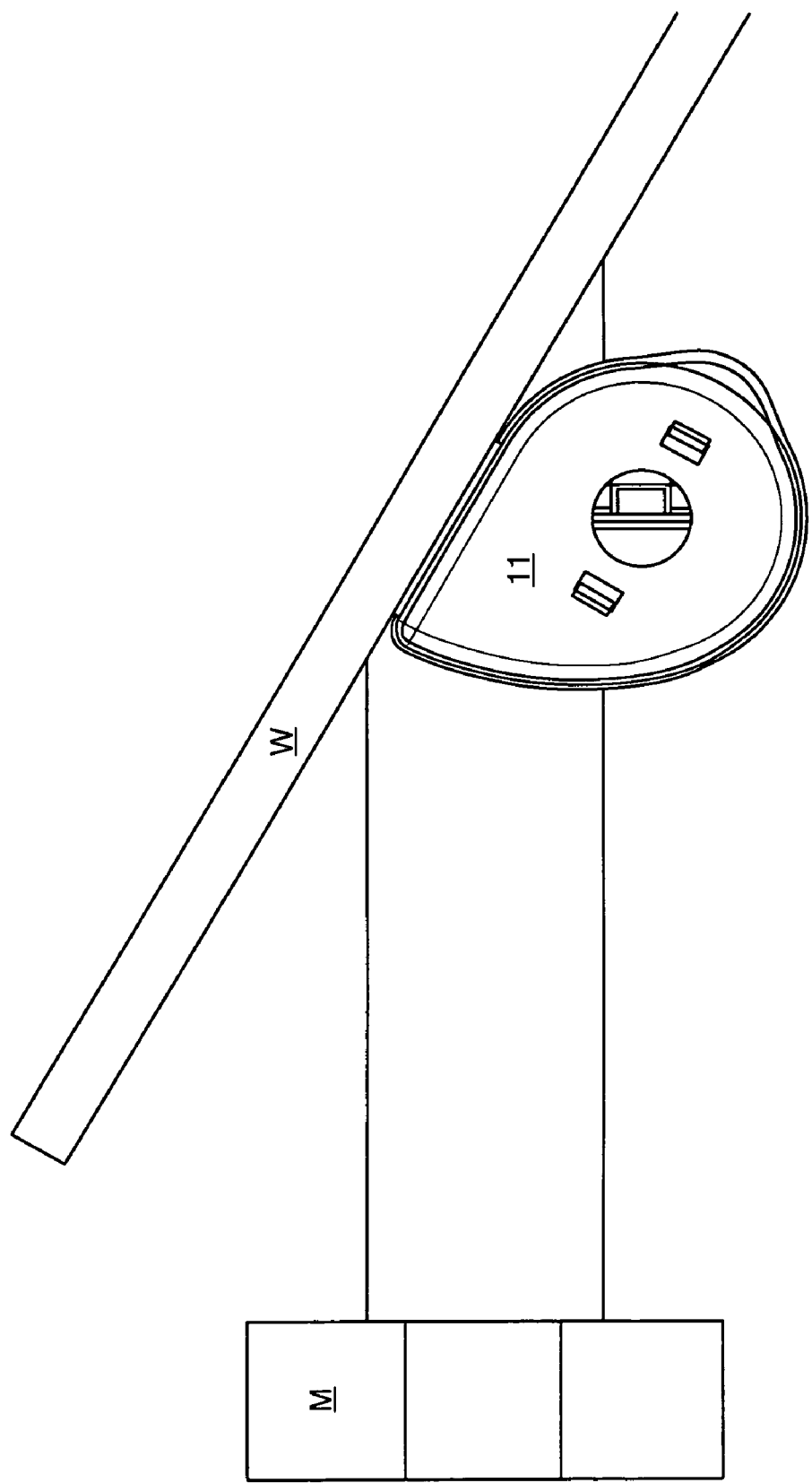
FIG. 13 is a side view of vehicle video recorder and rear view mirror shown in FIG. 1.
Figure 15:
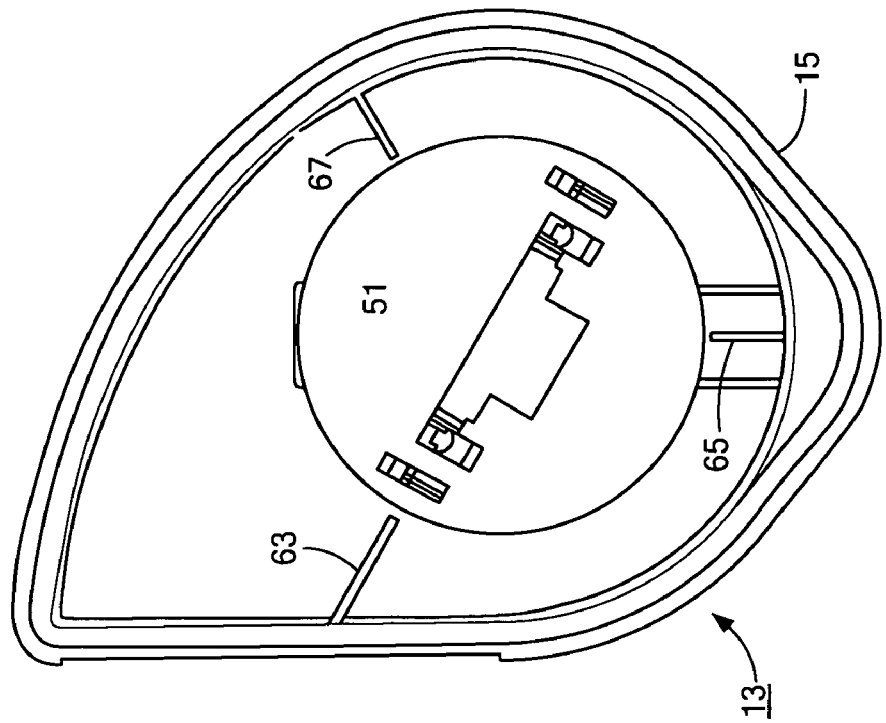
FIGS. 14 and 15 are left and right end views, respectively, showing how the disks on the ends of the PCB are mounted inside the housing.
Figure 14:
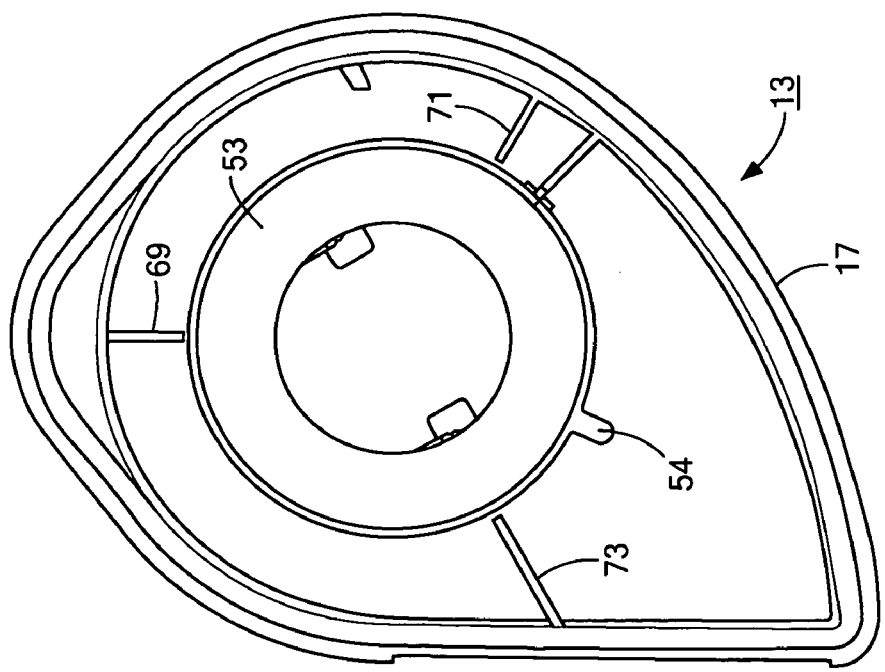

Video recorder 11 may be mounted on a windshield W of a vehicle next to a conventional rear view mirror M as shown in FIGS. 12 and 13 with its longitudinal axis LO generally parallel to windshield W. As can be appreciated, video recorder 11 is not exactly parallel to windshield W since windshield W in most all vehicles has some curvature.)

Figure 16:
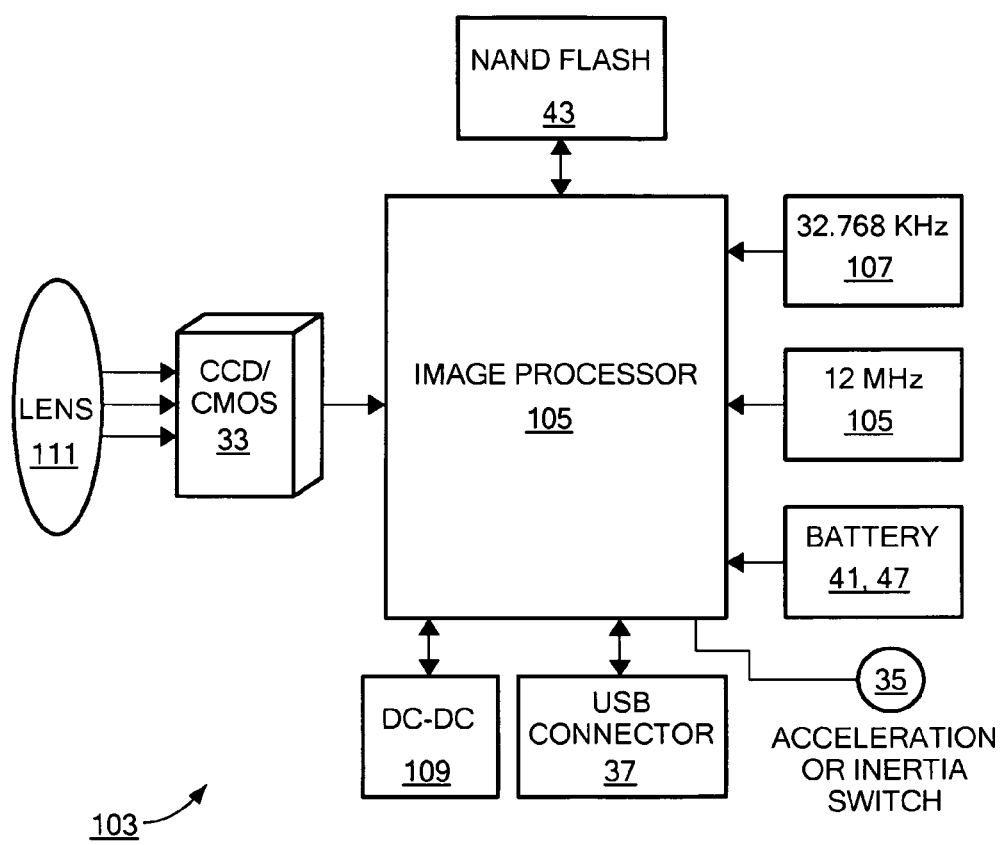
FIG. 16 is a block diagram of the component on the PCB.

Referring now to FIG. 16, there is shown a block diagram of how the electronics 103 in video recorder 11 operates. Electronics 103 is centered around image processor 45 and includes batteries 41 and 47, flash memory 43, acceleration switch 35 for start-up, camera 33 and USB connector 37. Electronics 103 further includes a 12 MHZ clock crystal 105, a 32,768 KHZ crystal 107 for RTC, a DC to DC converter 109 and a wide angle lens 111. Acceleration switch 35 does not require power to function properly; it senses the G-force from an impact due to an accident then powers the device. It can function as a momentary, normally open or normally closed switch. The switch function as a momentary, normally open or normally closed switch. The switch acceleration direction options are omni-directional, planar and linear. The system is programmed for automatic power off after every 30 second recording. The back programmed for automatic power off after every 30 second recording. The back end connectivity is achieved through the on chip USB 2.0 high speed master/slave driver. The DC-DC 87 converter is used to derive the various board voltages. The front-end service to image processor 45 is through the image sensor with the wide angle lens. The format of the output of the image sensor 33 is a standard format of YUV 4:2:2. Each 30 second recording will be stored in the Nand Flash 43 in three slots in FIFO queues. The old file will be automatically deleted without the user interrupt. All user application features will be integrated with the image processor firm ware through the host control embedded software architecture. The processed video compression format will be stored in flash and can be downloaded through mini USB 37 to a PC.

Figure 17:
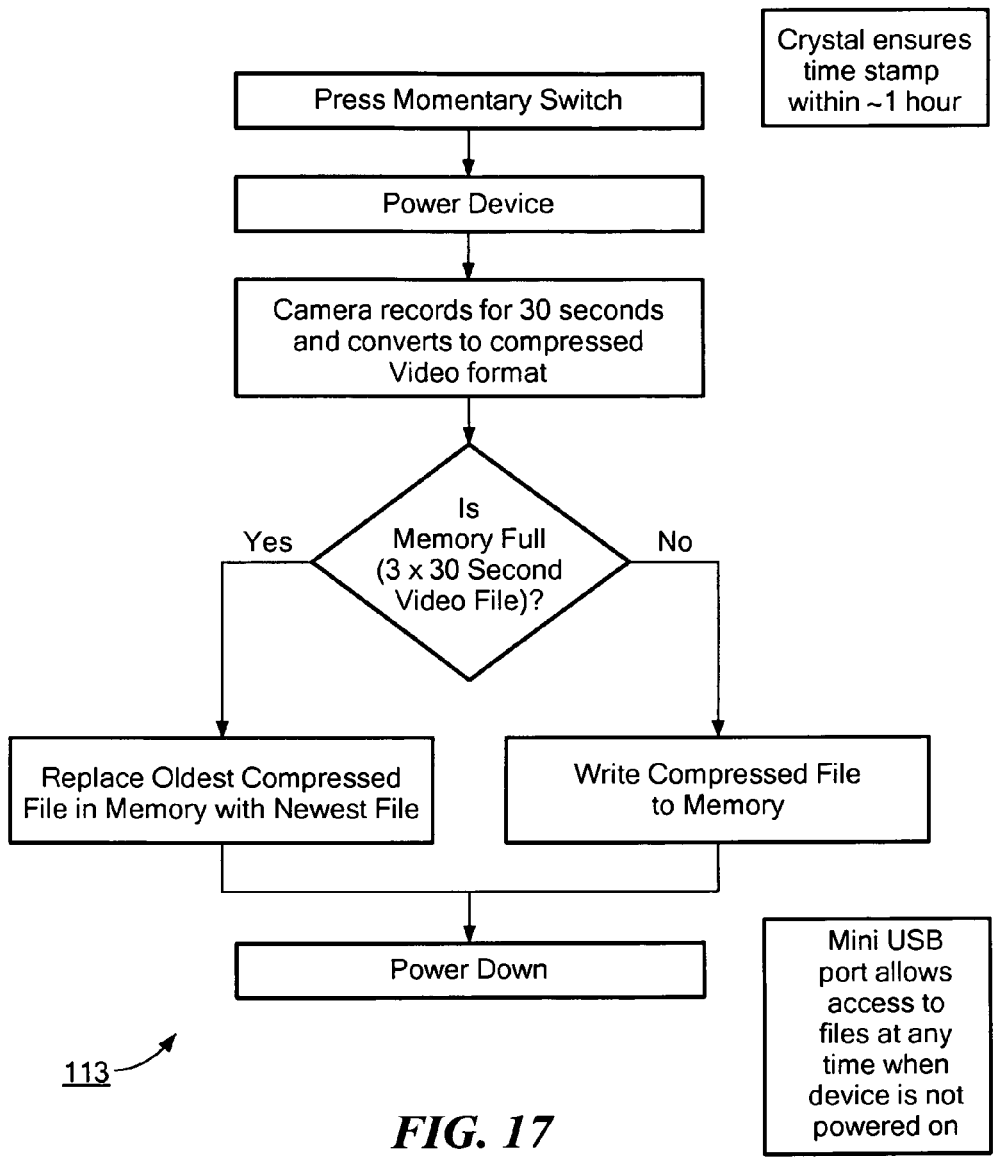
FIG. 17 is a flow chart showing how the video recorder functions.

A flow chart 113 of how the system in video recorder 11 operates is shown in FIG. 17.

Instead of a leveling mechanism in the form of batteries 41 and 49, the leveling mechanism can be a motor attached to a shaft on which the camera is mounted, the motor being coupled to a device that measures the tilt of digital camera 33 relative to its horizontal position.

Also, the leveling mechanism could comprise weights below video camera 33 attached to a shaft that is not constrained from rotation that is attached to video camera 33.

Also, the leveling mechanism could comprise a knob coupled to video camera 33 that is turned manually to automatically to level video camera 33.

Also, the leveling mechanism could comprise a mounting bracket on which the entire video recorder 11 and which can be rotated either manually or automatically.

Also, the leveling mechanism could comprise suspending the camera 33 in a liquid or using magnetic forces to cause the camera to remain balanced.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A video recorder which can be mounted on a vehicle for creating and recording images in response to a triggering event comprising:
   (a) a housing,
   (b) a mounting arrangement for fixedly mounting said housing of the video recorder onto said vehicle,
   (c) a printed circuit board having a longitudinal axis,
   (d) a mounting arrangement for mounting said printed circuit board inside said housing for rotational movement freely about said axis,
   (e) a camera fixedly mounted on said printed circuit board for creating images when activated and storing said images,
   (f) a switch for activating said camera only when acceleration of a predetermined value is sensed, acceleration of a predetermined value constituting said triggering event,
   (g) a leveling mechanism on the printed circuit board for causing the optical axis of the camera to be oriented approximately horizontal when the housing of the video recorder is fixedly mounted onto said vehicle, the vehicle is on a horizontal surface and said printed circuit board is not rotating freely but rather is at its "at rest" position,
   (h) a locking arrangement for locking said printed circuit board in its "at rest" position, to prevent rotational movement of the printed circuit board relative to said housing, and
   (i) electronics coupled to an antenna for controlling the operation of said camera and processing said images.

2. The video recorder of claim 1, wherein the mounting arrangement for mounting the printed circuit board inside the housing for rotational movement freely about its longitudinal axis comprises a pair of disks, one fixedly mounted on each end of the printed circuit board and a plurality of brackets on the housing for supporting said disks.

3. The video recorder of claim 2, wherein the leveling mechanism on the printed circuit board for causing the optical axis of the camera to be oriented approximately horizontal when the vehicle is on a horizontal surface and the printed circuit board is in its "at rest" position comprises a pair of batteries of about the same weight, one disposed on each side of the printed circuit board.

4. The video recorder of claim 3, wherein the locking arrangement for locking the printed circuit board in its "at rest" position comprises a clutch which removably couples one of the disks on the printed circuit board to the housing for preventing rotational movement of the printed circuit board relative to the housing.

5. The video recorder of claim 4, wherein the pair of batteries also serve to provide power to the video recorder.

6. The video recorder of claim 5, wherein the mounting arrangement for fixedly mounting the housing to the vehicle comprises a double sided pressure sensitive adhesive.

7. The video recorder of claim 6, wherein the camera is a CMOS image sensor.

8. The video recorder of claim 7, wherein the housing of the video recorder includes a window and the camera is located behind the window.

9. A video recorder which can be mounted on a vehicle for creating and recording images in response to a triggering event comprising:
   (a) a housing,
   (b) means for fixedly mounting said housing of the video recorder onto said vehicle,
   (c) a printed circuit board having a longitudinal axis,
   (d) a mounting arrangement for mounting said printed circuit board inside said housing for rotational movement freely about its longitudinal axis,
   (e) a camera fixedly mounted on said printed circuit board for creating images when activated and storing said images, the camera having its optical axis extending out at right angles to the printed circuit board,
   (f) a switch for activating said camera only when acceleration of a predetermined value is sensed, acceleration of a predetermined value constituting said triggering event,
   (g) a pair of batteries on the printed circuit board, one on each side thereof, for causing the printed circuit board to be disposed vertically and as a result the optical axis of the camera to be disposed horizontally when the housing of the video recorder is fixedly mounted onto said vehicle, the vehicle is on a horizontal surface, and said printed circuit board is at its "at rest" position, said batteries also providing power for the video recorder,
   (h) a locking mechanism for locking said printed circuit board in its "at rest" position against movement relative to said housing, and
   (i) electronics coupled to said camera for controlling the operation of said camera and processing said images.

* * * * *